(12) United States Patent
Tripodi et al.

(10) Patent No.: US 10,279,310 B2
(45) Date of Patent: May 7, 2019

(54) METHOD AND SYSTEM FOR FLUID STREAM CHEMICAL COMPOUNDS COLLECTION, DEPOSITION AND SEPARATION

(71) Applicants: INNOVATION IN SCIENCES & TECHNOLOGIES S.R.L., Rome (IT); Mauro Tripodi, Rome (IT); Paolo Tripodi, Rome (IT)

(72) Inventors: Mauro Tripodi, Rome (IT); Paolo Tripodi, Rome (IT)

(73) Assignees: IS Clean Air Italia S.R.L., Rovereto (IT); Giuseppe Spanto, Rome (IT); Mauro Tripodi, Rome (IT); Paolo Tripodi, Rome (IT)

( * ) Notice: Subject to any disclaimer, the term of this patent is extended or adjusted under 35 U.S.C. 154(b) by 266 days.

(21) Appl. No.: 15/021,236

(22) PCT Filed: Sep. 12, 2014

(86) PCT No.: PCT/IB2014/064464
§ 371 (c)(1),
(2) Date: Mar. 10, 2016

(87) PCT Pub. No.: WO2015/036967
PCT Pub. Date: Mar. 19, 2015

(65) Prior Publication Data
US 2016/0220949 A1    Aug. 4, 2016

Related U.S. Application Data

(60) Provisional application No. 61/877,072, filed on Sep. 12, 2013.

(30) Foreign Application Priority Data

Sep. 12, 2013   (IT) .............................. MI2013A1514

(51) Int. Cl.
*B01D 39/00*   (2006.01)
*B01D 49/00*   (2006.01)
(Continued)

(52) U.S. Cl.
CPC ............. *B01D 53/18* (2013.01); *B01D 3/008* (2013.01); *B01D 3/24* (2013.01); *B01D 3/30* (2013.01);
(Continued)

(58) Field of Classification Search
None
See application file for complete search history.

(56) References Cited

U.S. PATENT DOCUMENTS

| | | | | |
|---|---|---|---|---|
| 1,918,005 A | * | 7/1933 | Urquhart ................. | B01D 3/20 261/114.1 |
| 2,051,545 A | * | 8/1936 | Collins .................... | B01D 3/18 196/46 |

(Continued)

FOREIGN PATENT DOCUMENTS

| | | |
|---|---|---|
| CN | 1583223 A1 | 2/2005 |
| DE | 42 37 358 A1 | 5/1994 |

(Continued)

OTHER PUBLICATIONS

International Search Report dated Dec. 5, 2014, issued in PCT Application No. PCT/IB2014/064464, filed Sep. 12, 2014.
(Continued)

*Primary Examiner* — Amber R Orlando
*Assistant Examiner* — Phillip Y Shao
(74) *Attorney, Agent, or Firm* — Workman Nydegger

(57) ABSTRACT

A system for chemical compounds collection, deposition and separation in a fluid stream includes: a stack of layers with a number of window openings, allowing the fluid stream to pass through, neighboring layers forming an angle
(Continued)

$0 \leq \alpha < 90°$, the angle and the distance between neighboring layers being variable and controlled, so as to control the velocity of the fluid stream; spreading apertures in between the layers, and adapted to spray liquid chemical solution inside the closed volume, so as to create a thin film on the surfaces of the layers and lateral walls of the closed volume; a system for generating droplets of chemical solution upstream of the stack, to be mixed in the fluid stream; particles of the chemical compounds being collected by impaction with the droplets, and by diffusion on the thin film, and counter flowing with the chemical solution.

6 Claims, 6 Drawing Sheets

(51) Int. Cl.

| | | |
|---|---|---|
| *B01D 41/00* | (2006.01) | |
| *B01D 45/00* | (2006.01) | |
| *B01D 46/00* | (2006.01) | |
| *B01D 50/00* | (2006.01) | |
| *B01D 51/00* | (2006.01) | |
| *B01D 53/18* | (2006.01) | |
| *B01D 3/00* | (2006.01) | |
| *B01D 3/24* | (2006.01) | |
| *B01D 3/30* | (2006.01) | |
| *B01D 53/00* | (2006.01) | |
| *B01D 53/78* | (2006.01) | |
| *B01D 47/02* | (2006.01) | |
| *B01D 47/14* | (2006.01) | |
| *B01D 47/06* | (2006.01) | |
| *B01D 53/14* | (2006.01) | |

(52) U.S. Cl.
CPC .......... *B01D 47/024* (2013.01); *B01D 47/06* (2013.01); *B01D 47/14* (2013.01); *B01D 53/002* (2013.01); *B01D 53/1418* (2013.01); *B01D 53/78* (2013.01); *B01D 2252/103* (2013.01); *B01D 2257/106* (2013.01); *B01D 2257/302* (2013.01); *B01D 2257/404* (2013.01); *B01D 2257/504* (2013.01); *B01D 2257/7025* (2013.01); *B01D 2257/7027* (2013.01); *B01D 2258/06* (2013.01); *Y02C 20/20* (2013.01); *Y02P 70/34* (2015.11)

(56) References Cited

U.S. PATENT DOCUMENTS

| | | | | |
|---|---|---|---|---|
| 2,787,453 | A * | 4/1957 | Hibshman | B01D 3/24 |
| | | | | 202/158 |
| 3,464,679 | A * | 9/1969 | Becker | B01D 3/22 |
| | | | | 202/158 |
| 3,807,143 | A * | 4/1974 | Dunn | B01D 47/021 |
| | | | | 261/114.1 |
| 4,156,705 | A * | 5/1979 | Ogawa | B01D 3/24 |
| | | | | 261/106 |
| 4,673,464 | A * | 6/1987 | Zeitsch | B01D 3/22 |
| | | | | 202/158 |
| 5,478,507 | A * | 12/1995 | Bros | B01D 3/163 |
| | | | | 261/114.1 |
| 6,029,956 | A * | 2/2000 | McGrath | B01D 53/18 |
| | | | | 261/114.1 |
| 2012/0097031 | A1* | 4/2012 | McClelland | B01D 47/06 |
| | | | | 95/186 |
| 2015/0085600 | A1* | 3/2015 | Van Duijn | B01D 3/24 |
| | | | | 366/144 |
| 2016/0339355 | A1* | 11/2016 | Alzner | B01D 3/143 |

FOREIGN PATENT DOCUMENTS

| | | | |
|---|---|---|---|
| GB | 1 221 664 | 2/1971 | |
| GB | 1221064 A * | 2/1971 | ............... B01D 3/24 |
| GB | 2 307 191 A | 5/1997 | |
| JP | 11-114349 | 4/1999 | |
| WO | 2010/128360 A1 | 11/2010 | |

OTHER PUBLICATIONS

International Preliminary Report on Patentability dated Mar. 15, 2016, issued in PCT Application No. PCT/IB2014/064464, filed Sep. 12, 2014.

* cited by examiner

METHOD AND SYSTEM FOR FLUID STREAM CHEMICAL COMPOUNDS COLLECTION, DEPOSITION AND SEPARATION

FIELD OF THE INVENTION

The present invention relates to a method and system for fluid stream chemical compounds collection, deposition and separation, that separates chemical compounds in fluid streams by condensation in a solid large surface and by a separation and accumulation of the chemical compounds.

DESCRIPTION OF THE PRIOR ART

Different kinds of separator systems are known, especially liquid to gas contact devices, to be used in scrubbing systems mainly, based on the effect of impact between pollutants and liquid drops.

These known systems however are limited to the use only in particular situations of specific kinds of chemical compounds to be separated and accumulated, and are not optimized for a widespread use in different and changing situations and surfaces.

SUMMARY OF THE INVENTION

Therefore it is the main object of the present invention to propose a method and system for depositing and separating compounds present in a fluid stream passing through a condensation and separation system able to solve the above described problems.

The basic idea of the present invention is to create a system and method for condensing compounds present in a fluid stream and for separating the condensed material from the condensation surface, based on changing the fluid stream flux velocity.

It is a particular object of the present invention a method for chemical compounds collection, deposition and separation in a fluid stream, characterized in that it comprises the following steps:
  providing in a closed volume a stack of layers with a number of window openings, allowing the fluid stream to pass through, neighboring layers forming an angle $0 \leq \alpha < 90°$, the angle being variable and controlled, the distance between neighboring layers being variable and controlled, so as to control the velocity of the flow of fluid stream;
  providing in said closed volume spreading apertures in between the layers, adapted to spray liquid chemical solution inside the closed volume, and create a thin film of liquid chemical solution on the surfaces of the layers and lateral walls of the closed volume;
  generating droplets of chemical solution upstream of said stack, to be mixed in said fluid stream;
  collecting particles of the chemical compounds by impaction with the droplets, and by diffusion on the thin film, said particles counter flowing with the chemical solution.

It is a further object of the present invention a system adapted for chemical compounds collection, deposition and separation in a fluid stream, also adapted to be inserted in a closed volume, characterized in that it comprises:
  a stack of layers with a number of window openings, allowing the fluid stream to pass through, neighboring layers forming an angle $0 \leq \alpha < 90°$, the angle being variable and controlled, the distance between neighboring layers being variable and controlled, so as to control the velocity of the flow of fluid stream inside the system;
  a number of spreading apertures in between the layers, and adapted to spray liquid chemical solution inside the closed volume, so as to create a thin film of liquid chemical solution on the surfaces of the layers and lateral walls of the closed volume;
  a system for generating droplets of chemical solution upstream of said stack, to be mixed in said fluid stream;
  particles of the chemical compounds being collected by impaction with the droplets, and by diffusion on the thin film, and counter flowing with the chemical solution.

These and further objects are achieved by means of a method and a system adapted for condensing compounds present in the fluid stream and for separating the condensed material from the condensation surface, based on changing the fluid stream flux velocity, as described in the attached claims, which form an integral part of the present description.

BRIEF DESCRIPTION OF THE DRAWINGS

The invention will become fully clear from the following detailed description, given by way of a mere exemplifying and non-limiting example, to be read with reference to the attached drawing figures, wherein.

The same reference numerals and letters in the figures designate the same or functionally equivalent parts.

DETAILED DESCRIPTION OF THE PREFERRED EMBODIMENTS

In the following some non-limiting examples of embodiments of the method and system of the invention are described.

The system of the invention is adapted for condensing compounds present in the fluid stream and for separating the condensed material from the condensation surface, based on changing the fluid stream flux velocity, and comprises basically the elements described in the following.

The system is inserted in a closed volume, named "deposition stack", having a given shape, for example cylindrical shape, or parallelepiped shape or a custom non canonical shape.

The deposition stack has at least a surface area that allows the fluid stream to enter in the volume and at least a surface area that allows the fluid stream to escape from it.

The deposition stack has inside a hydraulic system that injects water or in general liquid chemical solution and releases the liquid from the entrance surface area.

The deposition stack has inside a stack of layers that allow the fluid stream and liquid to pass through by window openings present on them.

The hydraulic system is provided with spreading apertures, such as sprayers and/or nozzles and/or taps, which are present in between (inside) the layers, and preferably also on the lateral walls of the closed volume, adapted to spray water and/or liquid chemical solution inside the deposition stack, even in between the layers.

Figure 2:
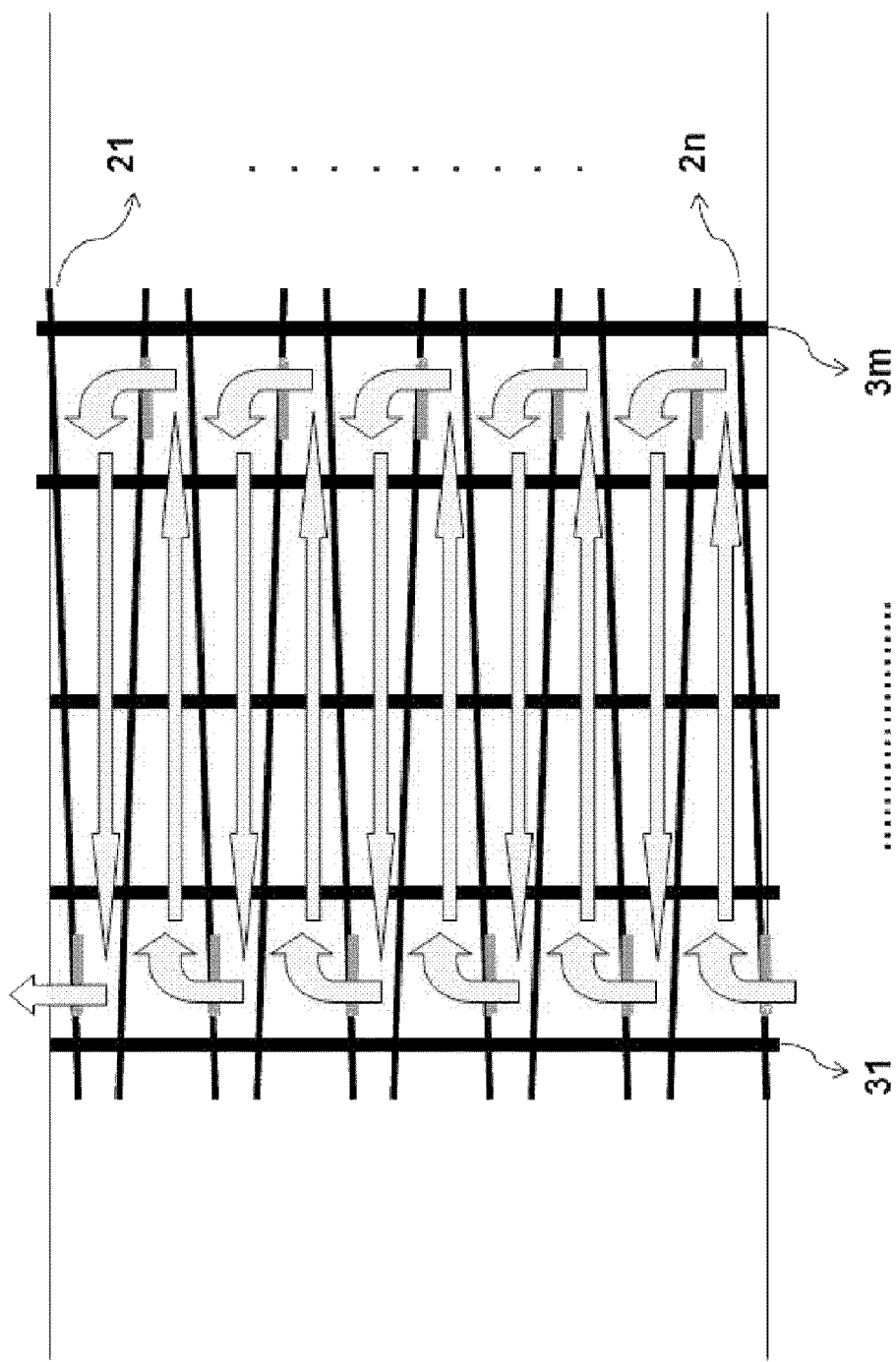
FIG. 2 shows example of embodiment of the liquid chemical solution fluid flow through the deposition stack.
Figure 3:
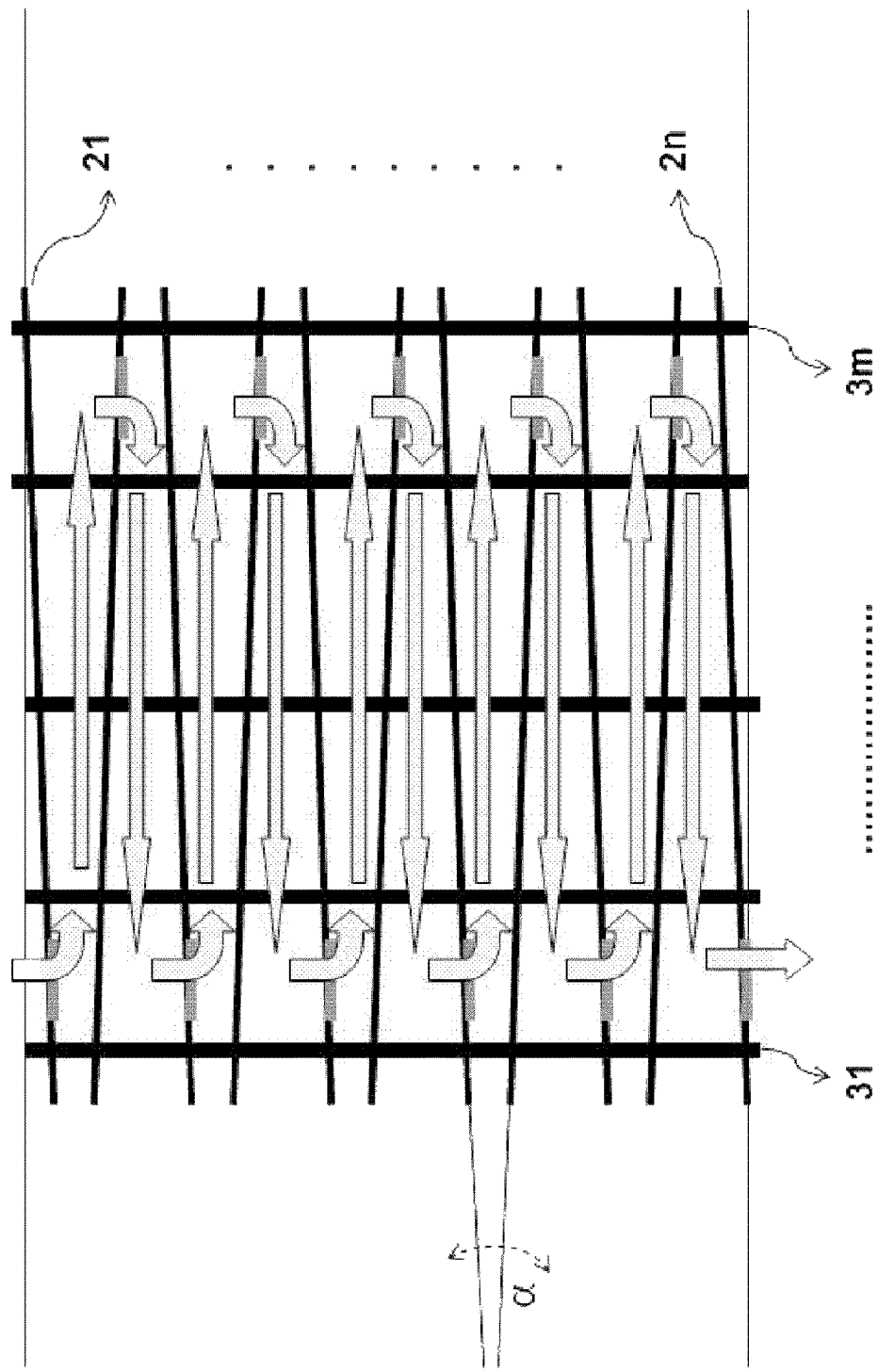
FIG. 3 shows example of embodiment of the counter flow liquid chemical solution through the deposition stack, still used to wash the surface of the deposition stack.
Figure 4:
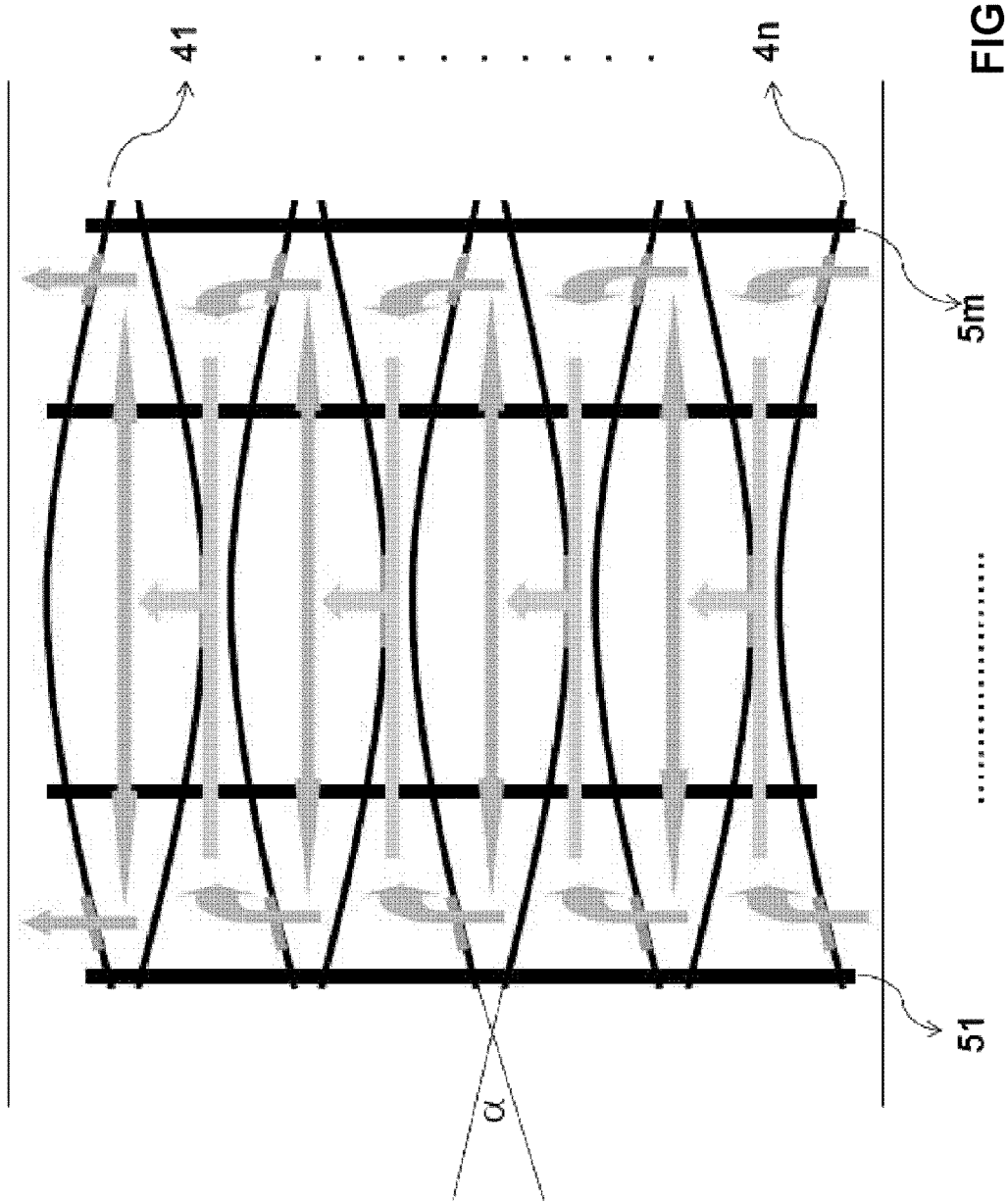
FIG. 4 shows example of embodiment of another deposition stack geometry with the liquid chemical solution fluid flow.

The stack of layers is preferably characterized by one or more of the following features:

The surfaces of the layers can be planar (surfaces 21, . . . 2n in FIGS. 2, 3) or non-planar (surfaces 41, . . . 4n in FIG. 4) . . . .

In the stack the distance between neighboring layers is variable and controllable;

In the stack neighboring layers form an angle $\alpha$ such that $0 \leq \alpha < 90°$; the angle is determined and possibly varied depending on the statistical composition of the particles (for example pollutant particles) to be separated, in particular towards greater angles for higher percentages of particles to be diffused, (i.e. inorganic substances in a great industrial plant, PM1) towards smaller angles for higher percentages of particles to be impacted, as explained below.

The layers are hanged to the deposition stack by suitable supports configured so as to be controlled for setting the angles between neighboring layers. In a possible embodiment, the supports can be the bars described below.

The window openings $S_i$ (FIG. 1) are preferably characterized by one or more of the following features:

The window openings have defined geometries even different among them, for example from circular to triangular geometry respecting the isoperimetric inequality;

The window openings are covered by a net, the net have a mash less than 5 mm;

every surface (layer) contain at least one window opening;

every surface (layer) can have window openings of diverse geometry;

disposition of window openings in a single layer can be irregular, even not copied in another layer of the same stack deposition; in successive layers the positions of the windows may be different.

The hydraulic system is preferably characterized by one or more of the following features:

The spreading apertures (sprayers and/or nozzles and/or taps) are present in between (inside) the layers, and preferably also on the lateral walls of the closed volume. For example in FIGS. 2, 3 and 4 the sprayers and/or nozzles and/or taps are obtained on a number of bars (31, . . . 3m; 51, . . . 5m) inserted substantially longitudinally in the volume, and passing through the layers. By means of the sprayers and/or nozzles and/or taps, water or liquid chemical solution is sprayed inside the volume in between the layers, substantially for washing the surfaces of the layers, and preferably the lateral walls of the volume, and draining away the particles to be collected in the counter flow. The form of the spreading apertures is determined depending on the kind of fluid to be sprayed, so as to spray as much of the solution as possible on the overall surface of the layers, even on the lateral walls of the volume. The adjustable slope of the layers of the stack in the closed volume has the advantage of increasing the draining effect.

In the system two opposite flow directions are present: a counter flow of water or liquid chemical solution (FIG. 3), and a forward flow of fluid of droplets and gas with particles to be collected, so obtaining a wet mix of chemical solution and main flow and creating a thin humid film depositing on the surfaces of the layers and lateral walls of the volume. The particles to be separated are collected both by the droplets, as a precipitate by impact, and by the thin film depositing on the surfaces of the layers, and flowing in the counter direction.

The forward fluid of droplets is created by means of any suitable device in the area upstream of the deposition stack, with respect to the main flow direction.

A non-limiting example of device for creating the flow of droplets is described in the Italian patent application No. MI2012A001893, filed on Nov. 6, 2012, in the name of the same applicant, which is hereby incorporated by reference in its entirety.

With reference to FIG. 6 (FIG. 2 of the cited previous patent application), a closed liquid solution pumping system is shown, able to pump a liquid solution inside the closed volume, so as to create droplets, to flow from a manifold 109 inside the volume.

A number of tubes with sprayer 211 are distributed on the manifold, to spray the liquid and create the droplets, to mix with the gas containing the particles to be dropped, and create a fluid upstream of the layers of the deposition stack and passing through the latter with a given inlet velocity.

Inside the layers of the deposition stack a turbulence is created, all the particles are collected, all the droplets fall down on the internal surfaces of the volume, and downstream of the deposition stack the gas purified of the particles flows away, eventually with a given percentage of humidity, or without humidity, depending on the specific framework of application.

Preferably the chemical solution pumped for creating the droplets is of the same kind of that sprayed through the spreading apertures described above.

The system is adapted so as to control the relative velocity of the particles and droplets: by changing the distance between the layers the minimum flow velocity is controlled, i.e. the more the distance the lower the flow velocity; by changing the dimensions and positions of the window openings on the layers the maximum flow velocity is controlled, i.e. the lower the dimension of the window openings, the higher the maximum flow velocity.

Therefore it is possible to obtain a functional to be adapted depending on the kind of particles to be handled, also varying in the time, by controlling the distances and angles between the layers, and amount of diffusion process, described in more details below.

According to a qualified aspect of the invention, the adaptability is obtained acting on the geometrical parameters of the deposition stack, instead of the flow chemical compositions. The latter are substantially water solutions of catalyzing substances known per se, depending on the specific kinds of particles to be treated.

The particles to be treated are for example pollutant's particles, i.e. PM1 . . . PM10, SOx, NOx, ozone, hydrocarbons, methane, benzene, etc. . . . ), and pollutants defined by law. In other cases, for example treatments for transformation of industrial streaming fluids or gases.

The system can be implemented by means of inert materials, for example polymers, or stainless steel, so as not to interfere with the process to be obtained.

The method of the invention is adapted for condensing compounds present in the fluid stream and for separating the condensed material from the condensation surface, based on changing the fluid stream flux velocity, and basically comprises steps as described in the following.

The deposition stack of the invention is adapted to collect particles (for example pollutant particles) in both liquid solution droplets present into the deposition stack and in the deposition stack surfaces. The size of liquid solution droplets is very small, i.e. droplets less than 10 μm, able to flow into the deposition stack. These liquid solution droplets completely wet the total free surface of the deposition stack. Furthermore, there are several liquid solution injectors inside the deposition stack that assure the total surface wetting and wash it.

The particles are mainly collected by means of the impaction effect and the diffusion effect, described in more detail below.

More particularly, as far as the impaction effect is concerned, in the deposition stack the particles (in particular pollutant particles) tend to follow the streamlines of the fluid flow stream. However, when liquid droplets are introduced into the stream, the particles cannot always follow these streamlines as they diverge around the liquid chemical solution droplets. Due to the particle's mass, they break away from the streamlines and impact the droplets.

Impaction effect increases as the diameter of the particles increases, and as the relative velocity between the particles and droplets increases.

As particles get larger they are less likely to follow the fluid flow streamlines around droplets. Also, as a particle moves faster relative to the liquid droplet, there is a greater chance that the particle will hit a droplet. Impaction is a very effective collection mechanism in the deposition stack, in particular for fluid flow having stream velocities greater than 0.3 m/s.

In this range of stream's velocity, particles of larger diameter, i.e. having diameters greater than 1.0 μm, are collected. Impaction also increases increasing the density of liquid solution droplets. Likewise for the impaction effect on the droplets, there is the impaction on the total surface of the deposition stack. A thin film of liquid chemical solution is present on the deposition stack total surface. Then all the particles impacting the surface are collected.

As far as the diffusion effect is concerned, very small particles (in particular pollutant particles less than 0.1 μm in diameter) experience brownian motion, random movement in fluid flow stream. These particles are so tiny that they are bumped by fluid flow molecules as they move in the fluid flow stream. The bumping causes them to move randomly in different ways, or to diffuse through the fluid flow. This irregular motion can cause the particles to collide with droplets and to be collected. Because of this, diffusion, like impaction, is very effective in collection mechanism in deposition stack, in particular for particles smaller than 0.1 μm.

The rate of diffusion depends on relative velocity between particles and liquid solution droplets and liquid chemical solution droplet diameters.

Likewise for the diffusion effect on the droplets, there is the diffusion on the total surface of the deposition stack. A thin film of liquid chemical solution is present on the deposition stack total surface. Then all the particles diffusing to the surface are collected by the thin film of liquid chemical solution.

For both impaction and diffusion effects, collection efficiency increases with an increase in relative velocity and a decrease in liquid droplet size.

Main characteristic of the deposition stack of the invention is the use of both effects referred to impaction on droplets and diffusion on large surface thin liquid film.

Another characteristic, as the relative velocity is a fundamental parameter for particles collection, is the peculiarity of the deposition stack able to obtain variable flow velocity through the entire deposition stack. Therefore it is possible to set-up the deposition stack in order to have the right functional of flow velocity able to collect specific particles just by setting the right flow velocity functional. In addition it is possible to collect different species of particles by setting a suitable flow velocity functional.

Figure 5:
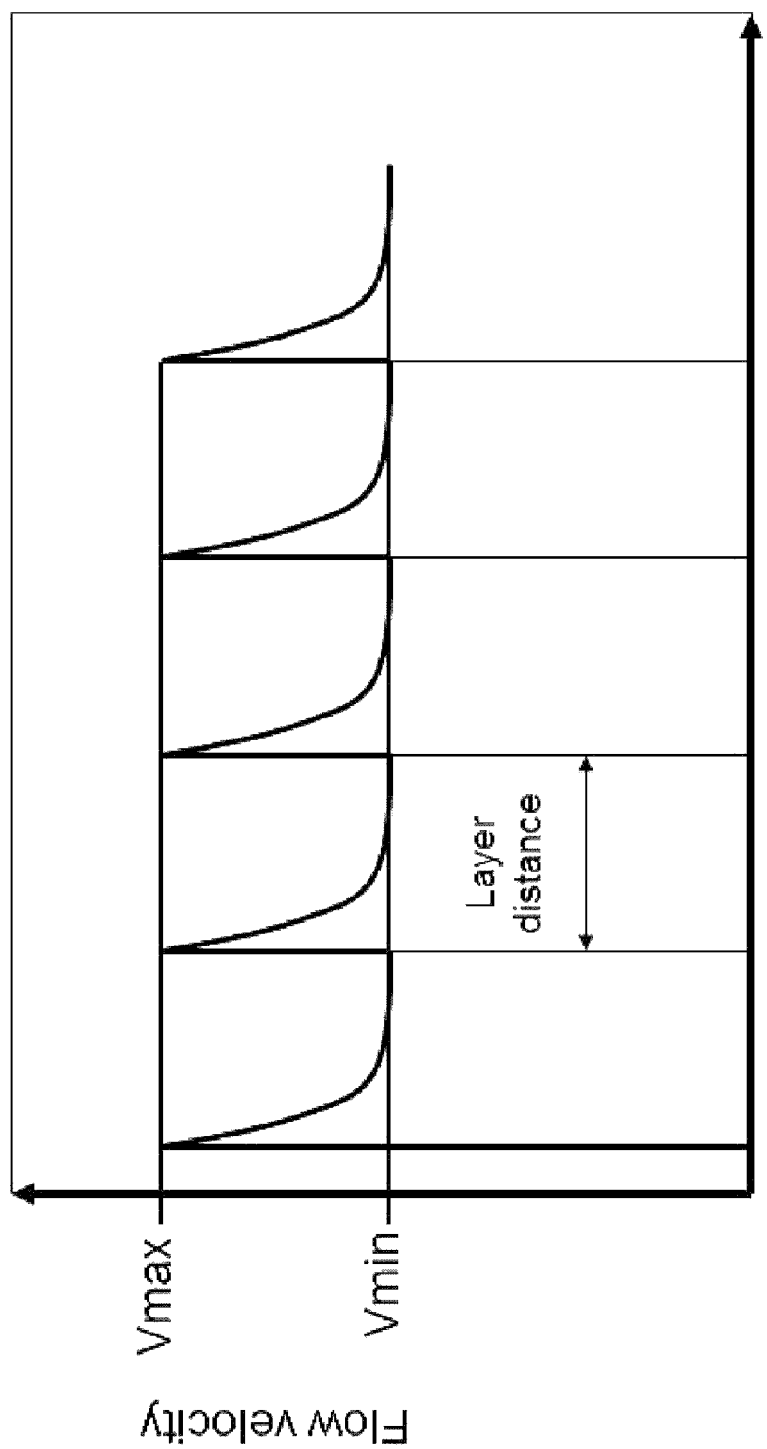
FIG. 5 shows example of embodiment of the isotropic liquid chemical solution flow velocity functional.
Figure 6:
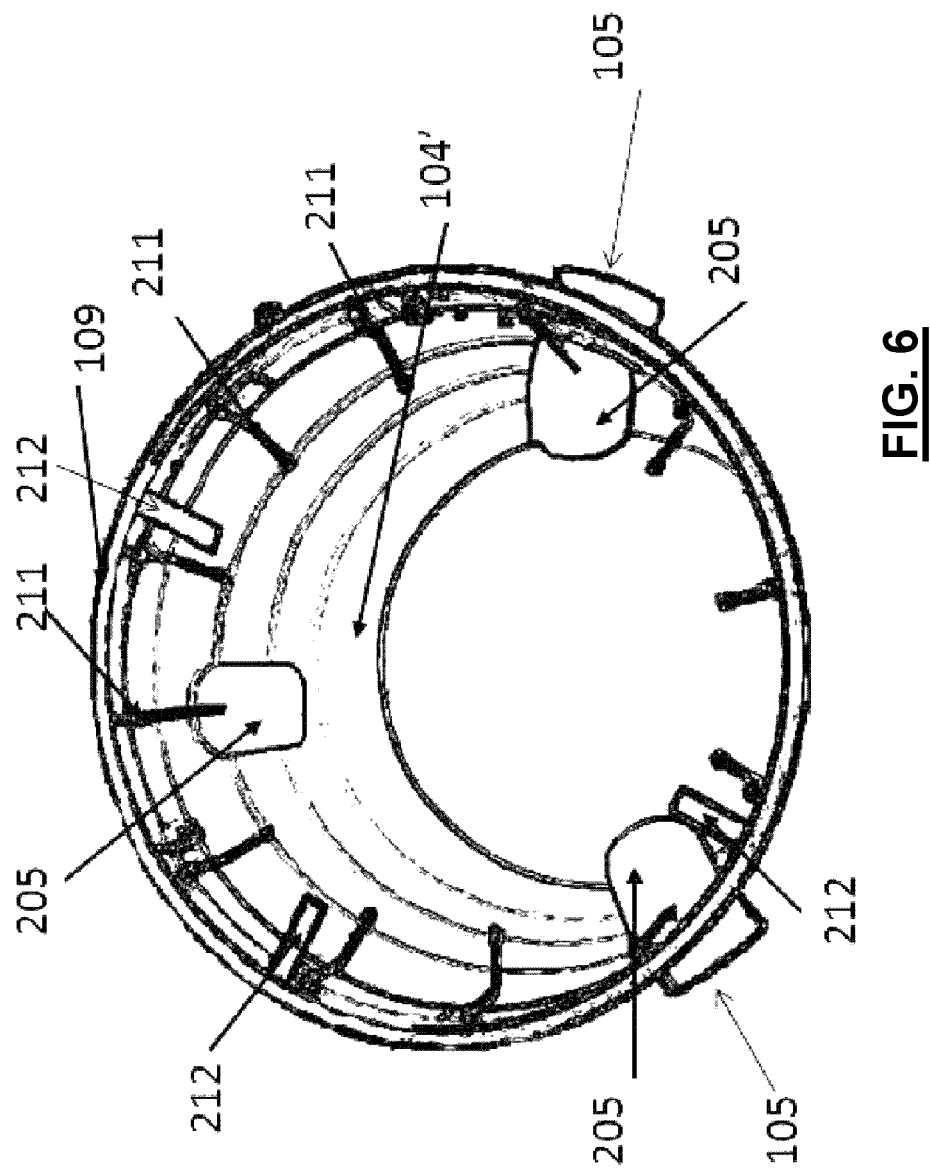
FIG. 6 shows an example of embodiment of a system for creating a flow of droplets upstream of the layers.

An example of flow velocity functional is described in FIG. 5. This is the case of isotropic deposition stack where the maximum flow velocity is constant and the minimum flow velocity too. In the described deposition stack it is possible to produce unnumerable diverse flow velocity functionals.

The functional parameters Vmax and Vmin in FIG. 5 represent absolute maximum and minimum velocities; in the most used configuration there are several relative minimum velocities Vmin and several relative maximum velocities Vmax, depending on the kind of particles to be treated.

Acting on the dimension of window openings it is possible to set the relative Vmax, while acting on the distance of consecutive layers it is possible to set the relative Vmin. These settings permit to affect in a precise mode the targeted particles and, at the same time, to have a large number of particles treated and collected.

Therefore different parameters can be set along the various layers depending on the variance of the particle's dimensions.

The general principles of the method for condensing compounds present in the fluid stream and for separating the condensed material from the condensation surface, based on changing the fluid stream flux velocity, subject of the invention are the following.

Figure 1:
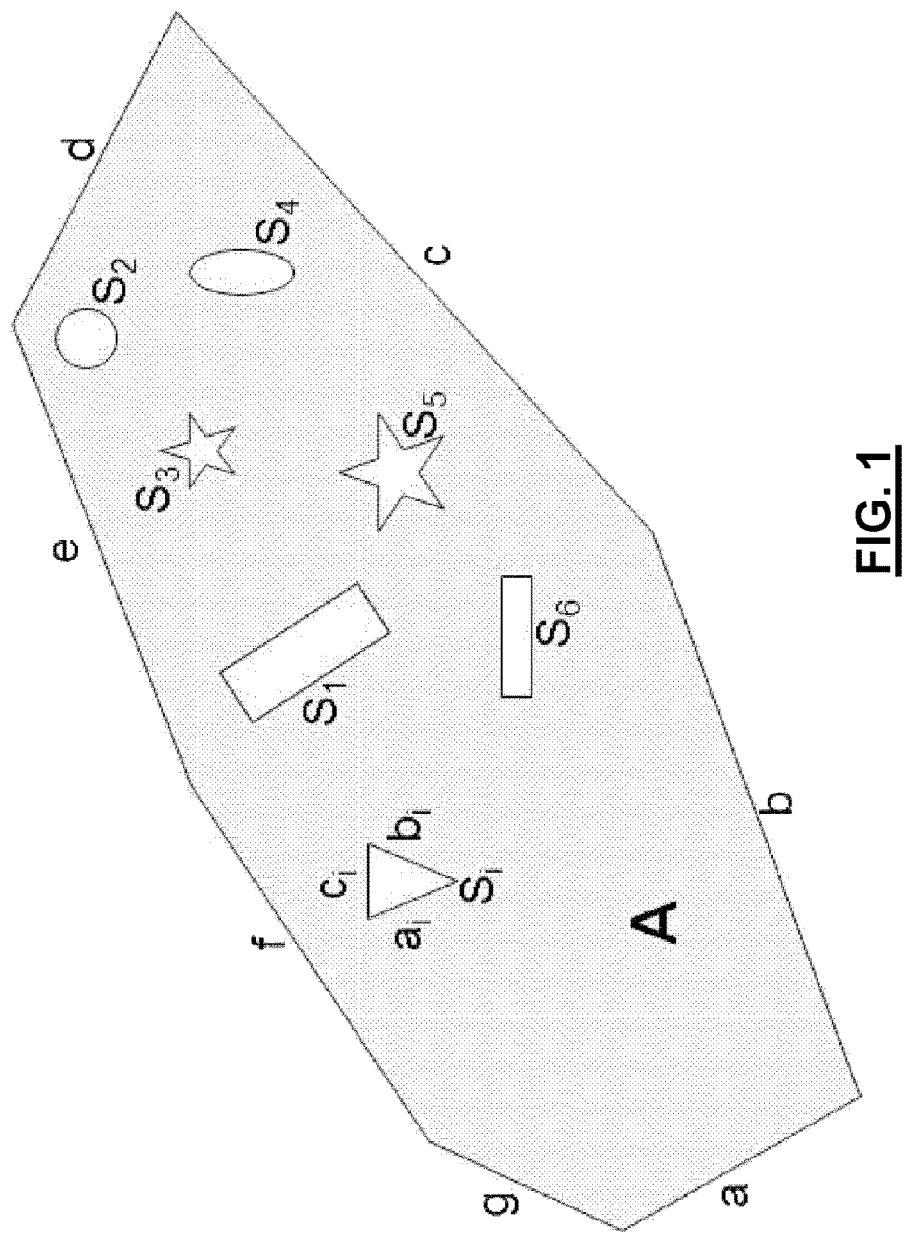
FIG. 1 shows an example of embodiment of a layer geometry.

Let's say S and P respectively the area and the perimeter of the generic window opening, in FIG. 1 we have as example window openings with area $S_i$ and perimeter $P_i=a_i+b_i+c_i$. Then the following isoperimetric inequality must be true:

$$4\pi S_i \leq P_i^2$$

Let's say A the area of a generic single layer of the deposition stack, in FIG. 1 we have an example of a generic layer with area A and perimeter P=a+b+c+d+e+f+g. Then the following inequality must be true:

$$10^{-4} A \leq \Sigma_i S_i$$

The method and system of the invention is applicable generally in a variety of devices, for example those known as wet scrubbers.

Generally scrubbers are streaming gas control devices that can be used to remove pollutant compounds and/or gases from industrial exhaust streams. For example air scrubber for removing carbon dioxide from the air.

Further implementation details will not be described, as the man skilled in the art is able to carry out the invention starting from the teaching of the above description.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

For example the main application of the system is in vertically oriented closed volumes and main flows, however any other orientation is possible, even horizontal.

The elements and characteristics described in the various forms of preferred embodiments can be mutually combined without departing from the scope of the invention.

The invention claimed is:

1. A system adapted for chemical compounds collection, deposition and separation in a fluid stream, also adapted to be inserted in a closed volume, wherein the system comprises:
    a stack of layers with a number of window openings, allowing the fluid stream to pass through, neighboring layers being parallel or forming an angle $0<a<90°$;
    a control system adapted to control said angle as the angle is variable, and also adapted to control a distance between neighboring layers of said stack of layers as the distance is variable, and also adapted to control a velocity of the fluid stream inside the system;
    a number of spreading apertures in between layers of the stack of layers, and adapted to spray liquid chemical solution inside the closed volume, so as to create a thin film of liquid chemical solution on surfaces of the layers and lateral walls of the closed volume;
    a system for generating droplets of chemical solution upstream of said stack of layers, to be mixed in said fluid stream; and
    said system adapted for chemical compounds collection, deposition and separation is constituted such that particles of chemical compounds are collected by impaction with the droplets, and by diffusion on the thin film of liquid chemical solution, and counter flowing with the chemical solutions;
    said stack of layers, control system, spreading apertures, system for generating droplets cooperating to obtain said chemical compounds collection, deposition and separation in the fluid stream.

2. The system as in claim 1, wherein said stack of layers comprises one or more of the following features:
    said surfaces of the layers are planar or non-planar;
    said control system controls said angle $0<a<90°$ between neighboring layers depending on a statistical composition of said particles, towards greater angles for higher percentages of particles to be diffused, or towards smaller angles for higher percentages of particles to be impacted; and
    said layers of the stack of layers are hanged to the closed volume by supports configured so as to be controlled for setting said angles between neighboring layers.

3. The system as in claim 1, wherein the following relation applies for a layer of the stack of layers:

$$10^{-4}A \leq \Sigma_i S_i$$

wherein:
    A is the area of the layer, $\Sigma_i S_i$ is the summation of the areas of the window openings on the layer of the stack of layers.

4. The system as in claim 3, wherein said window openings comprise one or more of the following features:
    the window openings have different geometries among them, even in the same layer of the stack of layers;
    the window openings are covered by a net; and
    the window openings have an irregular position in a layer of the stack of layers, even different from other layers of the stack of layers.

5. The system as in claim 1, wherein said spreading apertures comprise one or more of the following features:
    said spreading apertures are sprayers and/or nozzles and/or taps;
    said spreading apertures are present on the lateral walls of the closed volume; and
    said spreading apertures are obtained on a number of bars inserted longitudinally in the closed volume, and passing through the layers of the stack of layers.

6. A wet scrubber comprising a system as in claim 1.

* * * * *